July 28, 1942.  L. E. SODERQUIST  2,291,584
VULCANIZING PRESS
Filed May 29, 1940   2 Sheets-Sheet 1

INVENTOR
LESLIE E. SODERQUIST
BY Ely & Frye
ATTORNEYS

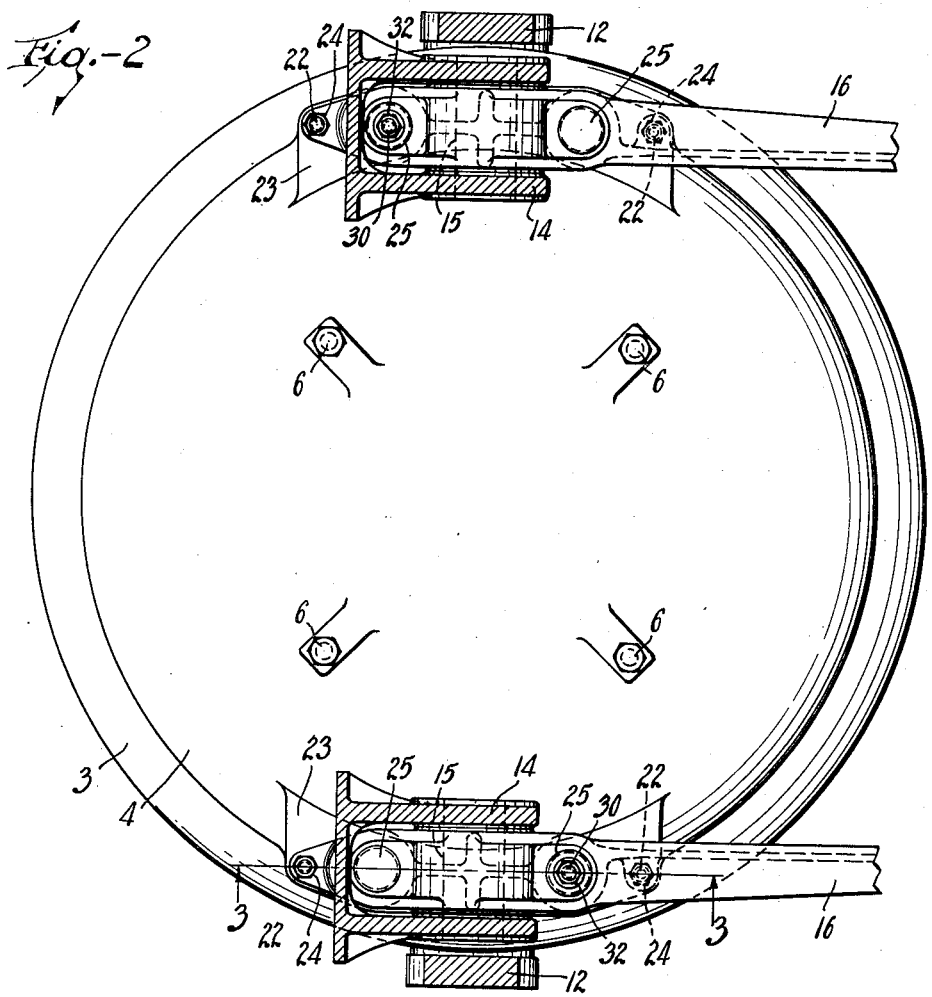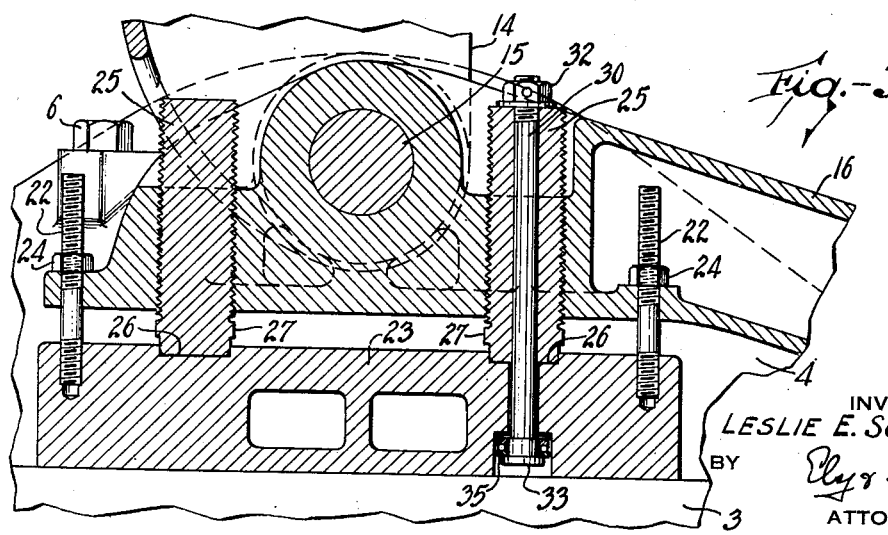

Patented July 28, 1942

2,291,584

UNITED STATES PATENT OFFICE 2,291,584

VULCANIZING PRESS

Leslie E. Soderquist, Akron, Ohio, assignor to The McNeil Machine & Engineering Company, Akron, Ohio, a corporation of Ohio Application May 29, 1940, Serial No. 337,825

1 Claim. (Cl. 18—17)

The present invention has for its object the improvement of means for attaching mold sections to the movable member of a press. As illustrated herein, the invention is applied to a tube vulcanizing press because accuracy of fit and full contact between the mold sections are particularly desirable in presses for this purpose, although the invention may also be applied to a tire vulcanizing press, or, in fact, to any other type of press.

The difficulty which is experienced in the operation of tube vulcanizing presses is in the tendency of the mold sections to spread at the region about the outer edge of the cavity under the heavy internal pressure which is applied to the interior of the tube during vulcanization. In other press constructions the mold will spread sufficiently to permit the rubber to spew out at points about the tube, making an objectionable excess rind on the tube and weakening the tube wall at those points where the spreading occurs. The construction of the press shown and described herein obviates all tendency to spread as the pressure exerted by the press is distributed over the entire upper surface of the upper mold section.

In former press constructions it has been the practice to secure the movable mold section directly to the movable press head by adjustable bolts arranged about the mold section, so that any adjustment is necessarily made between the head and the mold section. In the improved combination of parts shown herein, the mold section is fixedly attached to the press head and the adjustable connections are made between the operating arm and the press head. This gives a more accurate and more easily operable adjustment to the movable mold and its carrying members.

It is a further object of the invention to improve upon the adjustable means for supporting and correctly aligning the upper mold section so that it will meet the lower mold section in an all-around contact when the press is closed.

The invention is illustrated as applied to a specific design of press with a certain form of toggle mechanism for moving the upper press head, but this is for illustration only as the invention may be applied to any type of press-operating mechanism. Other changes and modifications may be made without sacrificing any of the benefits of the invention.

In the drawings:

Fig. 2 is a horizontal section on the line 2—2 of Fig. 1; and

Fig. 3 is an enlarged detail on the line 3—3 of Fig. 2.

Figure 1:
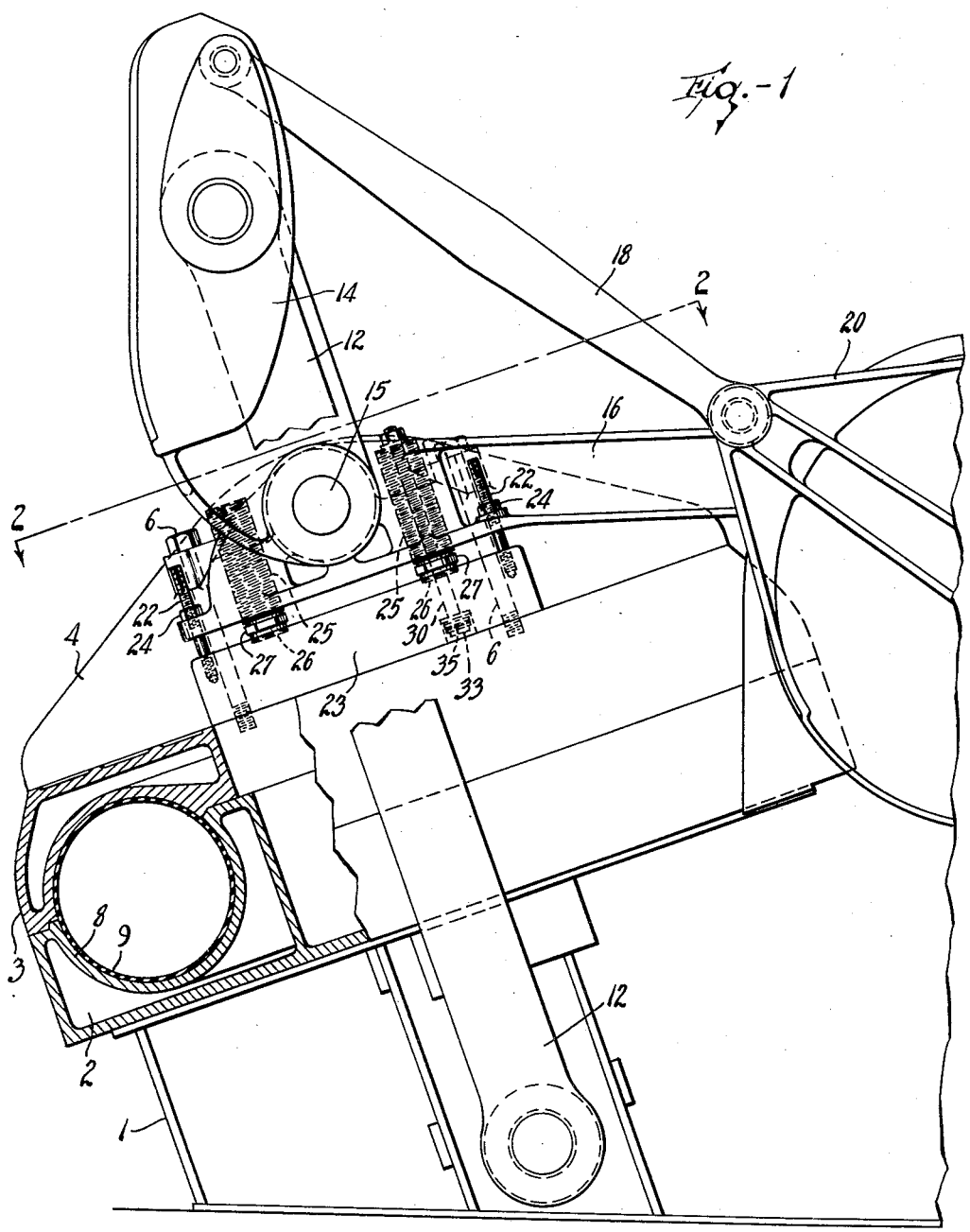
Fig. 1 is a side elevation of a typical press with the improved mold supporting and adjusting mechanism incorporated therewith.

As shown herein, the press is so arranged that the mold members are mounted upon an incline which is desirable in the vulcanization of inner tubes. For other articles, such for example, as tires, the press would be arranged so that the molds are horizontally disposed.

The base of the press is indicated at 1 and the lower mold section at 2 which is rigidly fastened to the base. The mating upper mold section is indicated at 3 and is carried by the upper movable press head 4, it being noted that mold section 3 is fixed to the face of the press head, bolts 6 being shown for that purpose, and that the press head extends outwardly over substantially the entire mold cavity 8 in which is shown the tube 9. During vulcanization the tube is subjected to a heavy internal fluid pressure, as is the usual procedure. In prior constructions it has been the practice to secure the upper mold section to the head by bolts or the like which are located near the center of the upper mold. In such cases the outer perimeter of the upper mold is wholly without adequate backing and the heavy internal pressure will cause the upper mold section to give or warp, causing the molds to spread apart in the region of the outer parting line. As a spread of only a few thousandths of an inch gives a sufficient opening for the rubber to flow during vulcanization, the formation of objectionable rinds necessarily follows. By providing the rigid backing of the press head clear to the outer parting line between the mold sections, no spreading of the mold sections is possible.

To the base of the press are pivoted the parallel links 12, the upper ends of which are pivoted to the swinging crosshead 14 which extends toward the upper press head where it is connected at the pivot points 15 to the supporting and carrying arms 16. These arms are movably mounted, as will be understood by those familiar with the construction of the type of press shown. The press head assembly is moved to open and close the press by the connecting link 18 from the main driving member 20. These details of press construction are given for that type of press which is illustrated, it being understood that any press-operating mechanism may be substituted therefor.

The upper press head 4 is suspended directly from the arms 16 by means of the four adjustable bolts 22 arranged in pairs on the arms 16 and threaded into wings or extensions 23 on the press head 4. The spacing of the press head from the arm is determined by the location of the nuts 24 on the bolts. The thrust of the upper mold is taken by the heavy bolts or studs 25 threaded in the arms and arranged in pairs on each arm. The bolts 25 are sufficiently rugged so that they are capable of withstanding the heavy forces which are occasioned when the press is closed. For this purpose the lower ends of the studs are received in sockets 26 in the wings 23. Between the arms 16 and the upper press head the studs are formed with flattened portions 27 by which they may be turned to secure the accurate adjustment which insures the initial all-around contact of the two mold members when they close.

It will be observed that two of the studs 25, namely, one of each pair, preferably diagonally opposite, are provided with a central supporting shaft 30, the upper end of which is provided with a fixed abutment in the form of a nut 32 which rests upon the top of the stud 25. The lower end of the shaft is extended into the press head and provided with an enlarged supporting collar 33. Between the collar and the under side of the press head is located a ball race 35 or other antifriction device. The purpose of this is to facilitate the adjustment of the studs, it being noted that when it is desired to adjust the press head the bolts 22 are first loosened, which transfers the load of the press head to the collars 33. The weight of the press head and the upper mold supported thereby is so great that turning of the studs 25 would be almost impossible were not this friction-reducing means provided.

It will be seen that there has been provided a greatly improved assembly and organization of parts to attain the results set forth. The spreading of the mold sections has been prevented and the transference of the adjustment from the usual location between the mold and the press head to its position between the supporting and operating arm and the press head gives better and more accurate and more easily operated adjustment. The position of the parts may be reversed, it being possible to apply the principles of the invention to a press in which the upper mold section is stationary, or in which both mold sections may be movable.

What is claimed is:

In a press of the type described, two mold sections movable toward and from one another, a supporting and carrying arm for moving one of said sections, a press head carried on said arm and having a face to which the movable mold section is fixedly attached over an area substantially equal to the area of the mold cavity, adjustable studs located in the arm and bearing against the press head to vary the angular relationship of the mold sections, and friction reducing means associated with the press head to support the press head while the studs are being adjusted.

LESLIE E. SODERQUIST.